United States Patent
Orme

[11] 3,899,001
[45] Aug. 12, 1975

[54] MULTI-PATH VALVE STRUCTURE
[75] Inventor: Myrl E. Orme, Canoga Park, Calif.
[73] Assignee: The Bendix Corporation, North Hollywood, Calif.
[22] Filed: June 6, 1974
[21] Appl. No.: 476,969

[52] U.S. Cl. .......... 137/625.3; 137/625.69; 138/42; 138/43; 181/36 R; 251/127
[51] Int. Cl.² ...................... F16K 47/08; F15B 21/04; F15D 1/02
[58] Field of Search ............. 137/625.3; 138/40, 42, 138/43; 251/127

[56] References Cited
UNITED STATES PATENTS

| | | | |
|---|---|---|---|
| 3,529,628 | 9/1970 | Cummins | 138/43 X |
| 3,692,064 | 9/1972 | Hohnerlein et al. | 138/42 |
| 3,780,767 | 12/1973 | Borg et al. | 137/625.3 |
| 3,856,049 | 12/1974 | Scull | 138/42 |

Primary Examiner—Alan Cohan
Assistant Examiner—Gerald A. Michalsky
Attorney, Agent, or Firm—Robert C. Smith; William F. Thornton

[57] ABSTRACT
Multiple path means for a fluid flow control device is shown in connection with a typical spool type servo valve. The multiple path means consists of a stack of washer-like elements or disks which cooperate to define a large number of finely divided flow paths across a stack of disks. To provide a configuration which is very economical of space, the disks are arranged such that the flow path turns back and forth through different planes. Groups of flow paths are defined by a number of groups of perforated disks confined between imperforate disks. Two perforated disks having patterns of openings are positioned on opposite sides of a similar disk having a pattern of small orifices. By proper juxtaposition of the three or more disks, a circuitous flow pattern is established from a first chamber defined by a first slot and its side walls, axially through a series of small orifices to a second such chamber, substantially radially through said second chamber and axially in the opposite direction through more orifices to another such chamber and continuing in this manner across the stack of disks. The dimensions of the slots and orifices are chosen such that the velocity of flow through any orifice does not exceed a desired limit. To assure a reasonably smooth flow, the disks are arranged such that flow can enter and/or leave the stack from three out of each set of four disks. Other numbers of disks may be used per set for each radial flow pattern.

14 Claims, 10 Drawing Figures

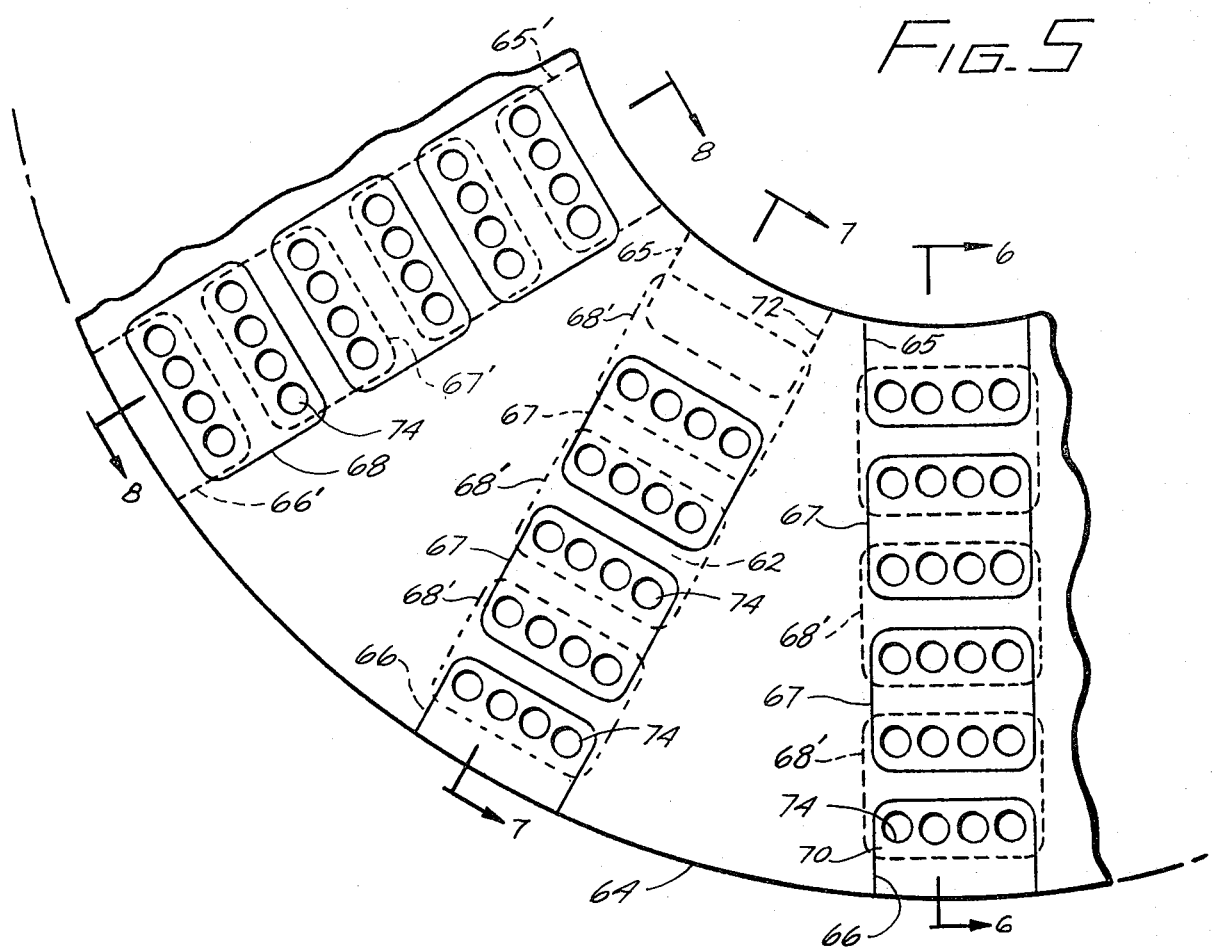

MULTI-PATH VALVE STRUCTURE

CROSS-REFERENCE TO RELATED APPLICATION

U.S. Pat. application Ser. No. 293,956 to Ralph L. Vick filed Oct. 2, 1972, now abandoned.

BACKGROUND OF THE INVENTION

In many flow control applications there is a need for structures which can vary the fluid-flow rate of flowing fluids without the production of noise and vibration. The term "throttling" is generally applied to the function of altering or adjusting fluid flow throughout a range of flow rates. The various structures by which the function is performed are generally called "throttling valves" to distinguish them from structures whose function is to open and close a flow path as a step function. To the extent that on-off valves are not opened and closed instantaneously, so that throttling noise and vibration may be produced therein at the time of opening or closure, the invention described herein is applicable to such valves as well, and they are included in the term throttling valve.

A typical control valve for handling the flowing of high pressure fluids employs a structure in which the cross-sectional area of the flow path is altered. This type of structure generally produces substantial noise and vibration and is quite subject to damage from cavitation. However, the structures employed in this arrangement are, as a class, least expensive and most conveniently employed. Of particular interest herein is a structure for quieting of and prevention of damage to spool valves. In general, the noise, vibration and cavitation generated in orificial valves is an incident to the Venturi effect which attends movement of the fluid through the orificial opening. When the orifice has reduced cross-sectional area, or is throttled, fluid velocity is reduced, and its pressure energy is reduced. The energy difference results in turbulence following the orifice where it is transformed into increased internal temperature of fluid and into acoustic energy in the form of noise transmitted through the fluid and in vibration in the surrounding structure, some of which occurs at audible frequency. In extreme cases, the turbulence results in localized pressure reductions downstream from the orifical restriction sufficient to form vapor spaces or pockets. The vapor in these spaces is returned to liquid as the vapor bubble is imploded by the pressure of the medium surrounding the bubble. This phenomenon is called cavitation and results in noise and occasional erosion of adjacent surfaces of the valve structure. It will be appreciated that there are many applications for which it is desired to substantially reduce both the noise and the effects of cavitation in operation of spool valves. It is also suspected that some damage may result from a molecular shearing phenomenon wherein, because of forcing fluids such as hydraulic oil through small areas with very high pressure differentials, electrons are actually separated from oil molecules which may be replaced from the surrounding metal, thus causing another form of erosion.

There have been many structures devised in an attempt to deal with the noise, vibration and damage resulting from operation of valves in high pressure systems. Most of these have involved some form of baffling means which operate in one way or another to divide the flow into finely divided streams. One such arrangement is described in the copending application of Ralph Vick, referred to above, in which flow is divided into many fine streams by a series of stacked disks surrounding a spool valve and in which each small stream is caused to flow into a chamber, from thence across an orifice to another chamber, reversing direction through another orifice, etc., and so on radially across the disks. In this arrangement the pressure drops across the disks are essentially those caused by the orifices in series. One problem which has been experienced with this arrangement is that the disks containing the orifices are not configured to receive or discharge fluid, nor are the blank disks. Thus, particularly where a spool valve has very small travel, the thickness of these "dead" disks creates an irregularity in flow which it is preferable to avoid.

DESCRIPTION OF THE DRAWINGS

FIG. 5 is an enlarged plan view, partly in phantom, of a group of the disks of FIGS. 3 and 4, as assembled;

FIG. 6 is a sectional view taken along line 6—6 of FIG. 5;

FIG. 7 is a sectional view taken along line 7—7 of FIG. 5;

FIG. 8 is a sectional view taken along line 8—8 of FIG. 5;

DESCRIPTION OF THE PREFERRED EMBODIMENT

Figure 1:
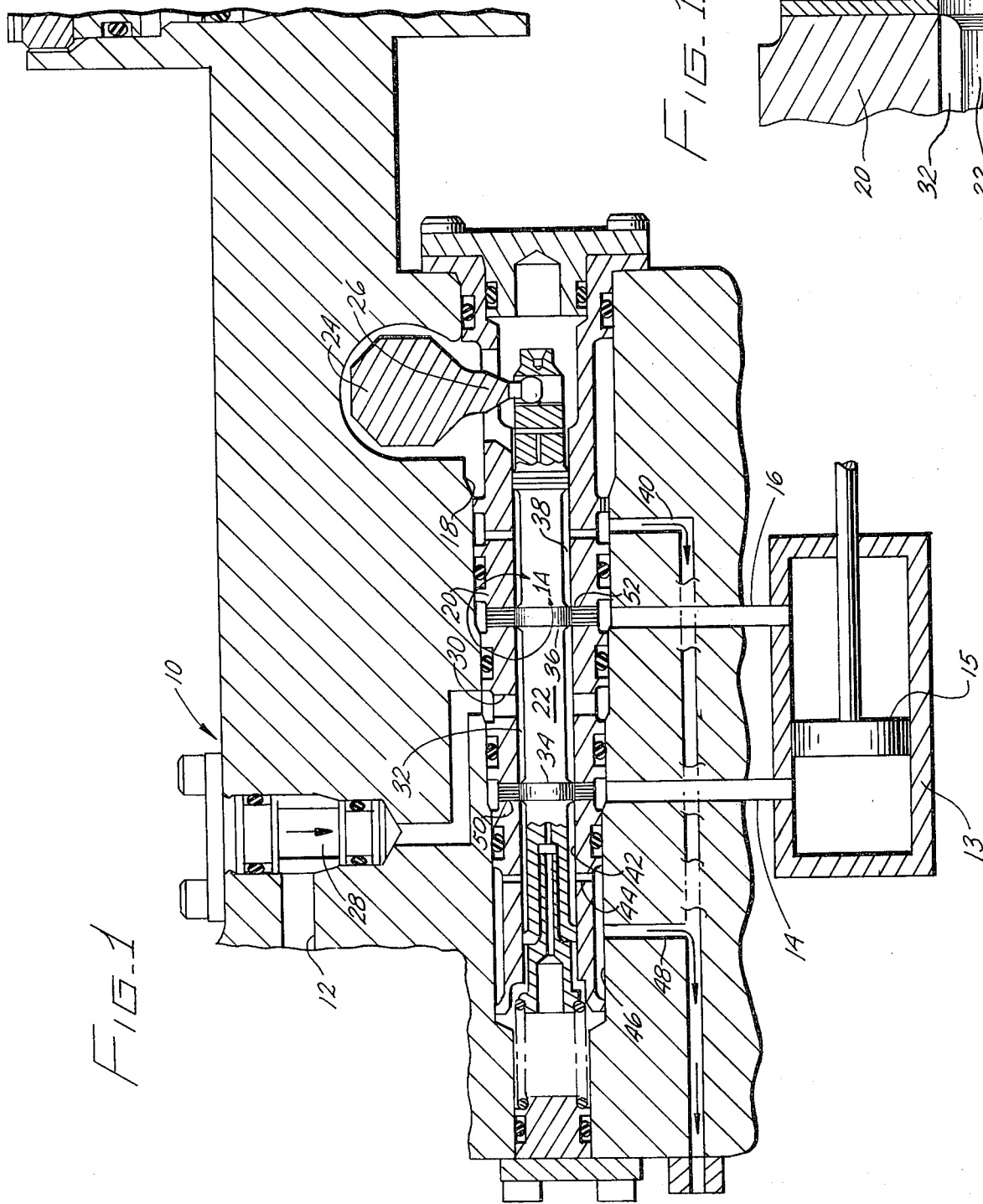
FIG. 1 is a cross-sectional view of a typical spool-type servo valve using my invention.

A flow control valve is shown generally at numeral 10 whose purpose is to control flow to an external utilization device such as a cylinder. Fluid from a source, not shown, is applied to an inlet passage 12, and flow from the valve member 10 is provided to an actuating cylinder 13 through outlet conduits 14 and 16 connected to opposite sides of a piston 15. Positioned within valve 10 is a generally cylindrical chamber 18 having a plurality of different diameters. The stationary sleeve member 20, having a plurality of matching diameters, is positioned in chamber 18. Axially movable within the sleeve 20 is a spool valve 22 which is directly driven mechanically by means of a rotatable control member 24 having an extendible arm 26 engaging the spool member 22.

Fluid flow entering inlet passage 12 passes a conventional check valve 28 and flows through an orifice or series of orifices 30 which are radially positioned through the side wall of sleeve member 20 to provide communication to a chamber 32. Defining the ends of chamber 32 are a pair of lands 34 and 36 movable axially with spool valve member 22 in such manner as to direct high pressure inlet fluid from chamber 32 into either of cylinder passages 14 or 16. When spool member 22 has moved toward the left, land 34 is similarly displaced, thus opening communication between chamber 32 and passage 14. At the same time land 36 also moves to the left, opening communication between passage 16 and a chamber 38 which communicates with return pressure through a line 40. This results in movement of piston 15 toward the right. Movement of the spool 22 in the opposite direction results in connecting high pressure fluid from chamber 32 to line 16 and permitting fluid on the left side of the cylinder 15 to be exhausted through passageway 14 into a chamber 42 which communicates with return conduit 40 through a line 44, a chamber 46 and a passageway 48, and causing piston 15 to be moved toward the left.

Surrounding each of lands 34 and 36 are stacks of disks 50 and 52, respectively, which are stacked in a face-to-face relationship and which include patterns of openings and orifices which divide the flow into a large number of flow paths for minimizing noise and/or cavitation or erosion damage to the valve which might otherwise result because of the high pressure differentials employed. It will be observed that with the particular valve configuration shown, flow may be directed across the disks either from inside to outside or from outside to inside, depending upon which set of disks is considered and which direction the spool 22 is moved. Because of the smaller effective area on the internal diameter, it is frequently important in this type of valve that the flow versus displacement relationship be reasonably smooth and that abrupt changes do not occur as the spool is moved across one disk element and then another.

FIG. 1a is an enlarged sectional view of the portion of FIG. 1 shown in circled outline. In this figure, land 36 is shown in such position that it registers exactly with all of the group of disks 52, thus blocking flow. From this figure it will be clear that as the land 36 is moved axially it will successively uncover the individual disks, thus permitting flow across the disks as permitted by the pattern of openings in the disks.

Figure 2:
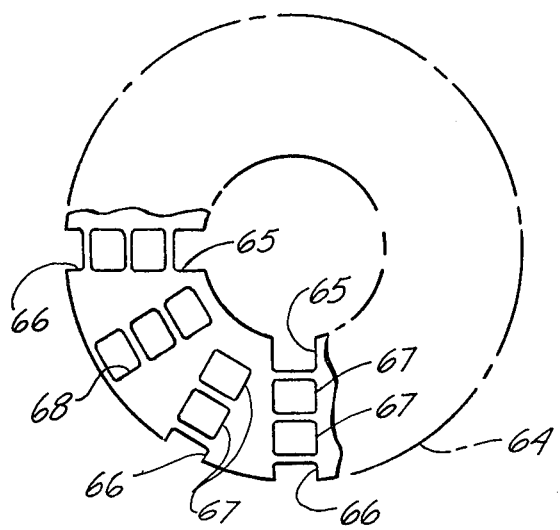
FIG. 2 is a plan view of one type of disk used in FIG. 1.

The configuration of the individual disks shown in groups 50 and 52 will become apparent from consideration of the following figures. FIG. 2 shows a disk 64 having a pattern of openings thereacross. Radial orientation of these openings is significant in understanding the various flow paths. Openings from the outside edge are shown at numerals 66 which are positioned at clock positions corresponding to 6 O'clock, 7 o'clock and 9 o'clock. Similar openings (not shown) are at 10 o'clock, 12 o'clock, 1 o'clock, 3 o'clock and 4 o'clock. On the inside diameter, openings 65 appear at the 6, 9, 12 and 3 o'clock positions. A plurality of openings 67 are radially aligned with openings 66 and 65 but not directly connected thereto. Located at the 8 o'clock position are a plurality of openings 68 which are radially aligned in sets, but it will be observed that each of the sets of openings 68 are misaligned with openings 66 and 67. Similar sets of openings 68 occur at the 11, 2 and 5 o'clock positions around the disks 64.

Figure 3:
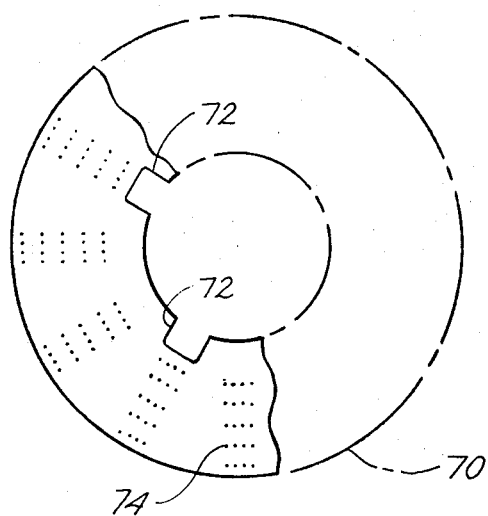
FIG. 3 is a plan view of a second type of disk used in FIG. 1.
Figure 4:
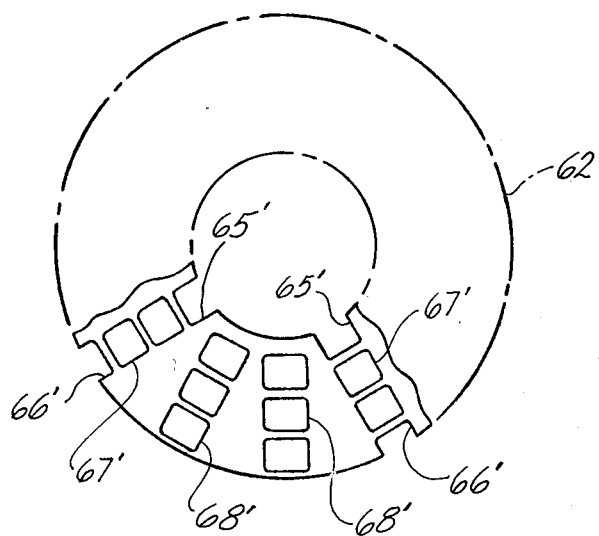
FIG. 4 is a plan view of a disk similar to that of FIG. 2 but radially displaced.

The disk shown in FIG. 3 is an orifice plate 70 which is positioned next to plates such as those shown in FIG. 2 and its radial orientation corresponds to that of FIG. 2. Orifice plate 70 includes a number of sets of finely divided orifices 74 which correspond in position with portions of the openings 66, 65, 67 and 68 described in connection with FIG. 2. In FIG. 3, it will be observed that there are openings 72 at the 7 and 10 o'clock positions communicating with the inside diameter of disk 70. Similar openings appear at the 1 o'clock and 4 o'clock positions of disk 70. FIG. 4 shows a disk 62 which may be identical to that of FIG. 2. As shown it is somewhat different as to position of the openings and is rotated one-twelfth or one clock position counterclockwise with respect to FIG. 2, such that openings 66' which correspond to openings 66 of disk 64 are now at the 5 and 8 o'clock positions, respectively, and the radially aligned openings 67' are similarly rotated from the positions of openings 67. At the 6 o'clock position of disk 62 the pattern differs from that at the 7 0'clock position of disk 64 in that the disk 64 has an outside opening 66 and there is no such opening in disk 62. These disks are then assembled in such manner that disk 70 would be placed between disks 64 and 62 preserving the radial orientation shown and in as many sets as desired with a blank disk between sets.

An enlarged composite view showing this arrangement appears in FIG. 5. In FIG. 5 the disk 64 is shown in the top position, showing an opening 66 at the outside edge of the 6 o'clock position and a similar opening 65 at the inside edge. Openings 67 are radially aligned with openings 66 and 65, and these directly overlie the orifice plate 70, and a plurality of the small orifices 74 formed in plate 70 are visible through openings 65, 66 and 67. Shown in phantom outline and enlarged slightly to distinguish them from the openings in disk 64 are a plurality of openings 68' which are radially aligned with the openings 65, 66 and 67 but misaligned along the radius therewith. Thus it will be seen that at the 6 o'clock position fluid may flow into the opening 66 or into the opening 65, depending upon the direction of flow at a given time. FIG. 6 shows a cross-sectional view taken through two stacks of disks arranged as shown in FIG. 5 at the 6 o'clock position. Disk 64 will be seen abutting directly against the surface of sleeve 20 with openings 65 and 66 on the inside and outside surfaces, respectively. The next disk shown toward the left is the orifice disk 70 which includes a plurality of the small orifices 74. No opening into this disk is shown in the 6 o'clock position. Adjacent disk 70 is the disk 62 which, as set forth above, is similar to disk 64 except for the extra openings 67, but rotated one-twelfth or one clock position such that it has no openings at this position communicating with the inside or outside surfaces. At this 6 o'clock position, flow may proceed into the opening 65, across an orifice 74 into a chamber defined by an opening 68', across another orifice 74 to a chamber defined by opening 67, across another orifice 74 to another chamber defined by opening 68', etc., and finally leaving the stack at opening 66. The flow may also be in the opposite direction from outside to inside. It will be observed that in this set there is also a fourth disk 76 which is a blank. Following disk 76 is an additional set of disks 64, 70 and 62 which function exactly as described. A further blank disk 76' is shown at the end. Alternatively, the set could be closed off by another portion of the sleeve 20. There may be as many similar sets of disks as are required to provide the desired flow rates.

Referring again to FIG. 5 and specifically to the arrangement shown at the 7 o'clock position, it will be observed that the openings 66 and 67 again overlie sets of orifices 74 of plate 70 and that these in turn overlie openings 68' in plate 62. In this position it will be observed that the openings into the stack are slot 72 one layer down in disk 70 at the inside surface and a slot 66 in disk 64 at the outside surface. Again, this may become somewhat more straightforward from consideration of the sectional view shown in FIG. 7 where, as before, the disks 64, 70 and 62 are shown confined between a portion of the sleeve 20 and the blank disk 76. In this case it will be observed that the flow is from the inside of the stack into slot 72 in the second disk 70 from whence it flows into a chamber defined by opening 68' in disk 62, across an orifice 74 in disk 70 and from there into a chamber defined by an opening 67 in disk 64. Flow then continues in the opposite direction across another orifice 74 into another chamber defined by an opening 68' and so on through the stack, exiting at an opening 66 in disk 64, as described. It will be observed that in the 7 o'clock position there is an opening at the second disk position at the inside diameter, but only in the first disk position at the outside diameter.

Referring now to FIG. 8, which is a cross-section of FIG. 5 taken at the 8 o'clock position, it will be observed that there is no opening to either the inside or outside surfaces of the disk 64 and no such opening on the disk 70, but there is an opening 65' in the disk 62 at the third disk position. Flow into opening 65' proceeds across an orifice 72 in the orifice plate 70 into the chamber defined by the opening 67; from thence across plate 70 in the opposite direction through another orifice 72 into a chamber defined by opening 67' and continuing in the manner described until the flow leaves the stack at an opening 66'. Again, a blank disk 76 cooperates with the openings 67' and 68' to define their respective chambers. The disks in the stacks shown are preferably fastened together to form rigid units as by brazing. If this is not done, it is possible for flow patterns to become disturbed through misalignment of the disks and for mechanical vibrations to be introduced.

Figure 9:
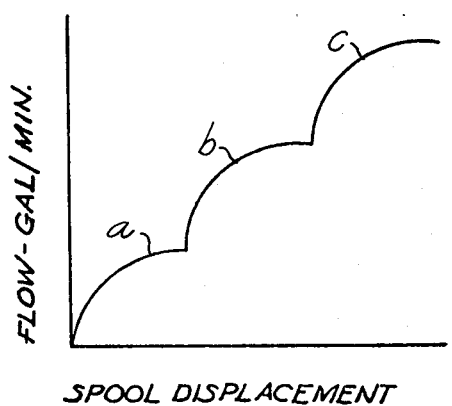
FIG. 9 is a graph showing the relationship of flow vs. displacement of a valve like that described in connection with FIGS. 1—8.

Now considering the operation of the organization described, when the land 36 overlies the stack of disks 52 as shown in FIG. 1a, all openings are blocked and no flow across the stack results. Let us now assume that land 36 overlies the stack as shown in FIG. 6 and is then moved to the left an amount equivalent to the width of disk 64. This would expose opening 65, permitting flow through the first set of three adjacent disks as described. The flow versus displacement relationship shown as the land moves across the edge of disk 64 is shown in FIG. 9 in the portion of the curve marked a. It will be observed that this characteristic is such that as the land moves across the disk and the opening becomes substantially larger, flow first increases quite rapidly and then increases less rapidly as the displacement approaches the width of disk 64. Further movement will begin to uncover the opening 72 in disk 70 and gives rise to a further rapid increase in flow which then slows to a smaller value as the displacement approaches the width of disk 70 as shown in the portion of the curve marked b. As the opening 65 is uncovered by the spool, flow again increases rapidly, and an essentially similar characteristic is shown as the spool proceeds across the opening 65' in disk 62. It will be appreciated that no change in the flow occurs with further displacement across the blank disk 76 after which the identical pattern of increased flow occurs as the spool moves past the second set of disks 64, 70 and 62. Were there several sets of such disks, this pattern would continue to be repeated with a short interval of no increase in flow at every fourth disk where a blank disk is passed. Since, as viewed from the internal surface of the stack, three of the four disks in a set are configured to admit flow, a relatively smooth flow versus displacement pattern results which is particularly useful where normal displacements of the spool valve member 22 are small. In application Ser. No. 293,956 of Ralph L. Vick, referred to above, the flow vs. displacement pattern is less smooth and less appropriate to valves involving very small displacements because only every other disk admits flow into the stack.

Modifications will become apparent to those skilled in the art. While the above embodiment has been described in terms of groups of three disks defining flow chambers and orifices defined by blank disks or blank surfaces, different numbers may be used. Particularly, where the disks may be substantially larger and where the inner diameter may be larger in proportion to the outer diameter than in the embodiment described herein, the circumference might preferably be broken into segments of 16 or 24, for example, rather than 12 as described. In such a case, the number of disks in a set between blanks may be 4 to 7, thus reducing the number of blank disks in proportion to the whole, thereby providing an even smoother flow versus displacement relationship. And while the invention has been described in connection with a conventional spool type servo valve, it will be appreciated that it may be appropriate to other types of similar valves such as flow-regulating or relief valves.

I claim:

1. A valve comprising
   a flow path including an opening to said flow path;
   means for closing said opening in variable degree;
   and means for dividing the flow through said opening into a plurality of streams comprising a stack of members across said opening having abutting faces including a first group of said members having passageways therethrough arranged in a series of patterns across the width of said members, said patterns including slots admitting flow into said stack only at certain intervals around the edges of said members, a second group of said members wherein a single member of said second group is interposed between two members of said first group, members of said second group having a series of orifices therethrough substantially smaller than said passageways and registering with said passageways, and including a pattern of slots admitting flow to said stack, said slots being radially displaced from the slots in said first group of members, each of said two members having its passageways in registry with the orifices in said single member but offset with respect to each other, and
   a third group of said members which are imperforate and which abut against opposite faces of at least some of said first group of members to confine flow to a plurality of generally serpentine paths across said stack, said passageways defining chambers of cross-sectional area substantially exceeding the area of said orifices.

2. A valve as claimed in claim 1 wherein said stack includes at least one set of said members comprising at least three members of said first group having at least some of said slots radially displaced from each other, at least two members of said second group having said slots radially displaced from the slots of adjacent members of said first group, and a member of said third group.

3. A valve as claimed in claim 1 wherein the slots of said second group communicate with passageways in members of said first group of members.

4. A valve as claimed in claim 1 wherein the members in said stack are brazed together to form a rigid structure.

5. A flow control valve as set forth in claim 1 wherein said valve includes a plurality of stacks.

6. In a flow control valve wherein a spool valve member is movable within a sleeve to open and close fluid passageways in said valve, a rigid structure forming part of said sleeve for dividing the flow entering and leaving said passageways into a plurality of streams comprising a stack of laminar disks having abutting faces and internal edge surfaces adjacent said spool member,
   said disks including a first group having a pattern of openings therethrough including a pattern of slots affording entry into said stack, a first subgroup of said group being radially oriented in a desired position and a second subgroup of said group being radially displaced from said first subgroup such that the openings therein overlap but do not directly register with openings in said first subgroup,
   a second group of disks having a pattern of orifices therethrough interposed between members of said first and second subgroups, said orifices individually being of substantially smaller area than said openings and providing communication between members of said first and second subgroups and including a pattern of slots affording entry into said stack radially displaced from the slots of either of said first and second subgroups but communicating with openings therein, and
   a third group of imperforate disks positioned between selected pairs of disks of said first group for confining flow to generally radial flow patterns across said stack.

7. A flow control valve as set forth in claim 6 wherein said first group includes at least second and third subgroups of disks each having a different radial orientation from that of said first subgroup, and disks of said second group are interposed between each pair of said first group.

8. A flow control valve as set forth in claim 7 wherein said second group of disks includes a first subgroup and at least a second subgroup having a pattern of said slots radially displaced from slots of said first subgroup.

9. A flow control valve as set forth in claim 8 wherein said disks are arranged in sets including disks of said first, second and third subgroups of said first group; disks of said first and second subgroups of said second group positioned between disks of said first and second, and second and third subgroups of said first group, respectively; and a disk of said third group.

10. A flow control valve as set forth in claim 9 wherein a plurality of said sets are included in each stack.

11. A flow control valve as set forth in claim 6 wherein said disks are arranged in sets including in order at least a disk of said first subgroup, a disk of said second group, a disk of said second subgroup, and a disk of said third group.

12. A flow control valve as set forth in claim 11 wherein a plurality of said sets are included in each stack.

13. A flow control valve as set forth in claim 6 wherein said disks in said stack are brazed together to form a rigid structure.

14. A flow control valve as set forth in claim 6 wherein said valve includes a plurality of stacks.

* * * * *